(12) United States Patent
Jin et al.

(10) Patent No.: US 11,070,962 B2
(45) Date of Patent: Jul. 20, 2021

(54) INFORMATION PROCESSING DEVICE, INFORMATION PROCESSING SYSTEM, METHOD OF PROCESSING INFORMATION, AND NON-TRANSITORY COMPUTER-READABLE RECORDING MEDIUM STORING PROGRAM

(71) Applicant: TOYOTA JIDOSHA KABUSHIKI KAISHA, Toyota (JP)

(72) Inventors: Xin Jin, Nagoya (JP); Miharu Hanai, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 12 days.

(21) Appl. No.: 16/055,814

(22) Filed: Aug. 6, 2018

(65) Prior Publication Data

US 2019/0075434 A1     Mar. 7, 2019

(30) Foreign Application Priority Data

Sep. 6, 2017   (JP) .............................. JP2017-171000

(51) Int. Cl.
| | |
|---|---|
| *H04W 4/00* | (2018.01) |
| *H04W 4/40* | (2018.01) |
| *G01C 21/36* | (2006.01) |
| *H04W 4/44* | (2018.01) |
| *G06Q 50/00* | (2012.01) |
| *H04W 4/21* | (2018.01) |

(52) U.S. Cl.
CPC ............ *H04W 4/40* (2018.02); *G01C 21/362* (2013.01); *G01C 21/3617* (2013.01); *G01C 21/3682* (2013.01); *H04W 4/44* (2018.02); *G06Q 50/01* (2013.01); *H04W 4/21* (2018.02)

(58) Field of Classification Search
CPC ............. G01C 21/3617; G01C 21/362; G01C 21/3682; H04W 4/21; H04W 4/20; G06Q 50/01
USPC .......................................................... 701/36
See application file for complete search history.

(56) References Cited

U.S. PATENT DOCUMENTS

| | | | |
|---|---|---|---|
| 2014/0200803 A1 | 7/2014 | Kinoshita et al. | |
| 2015/0253146 A1* | 9/2015 | Annapureddy | ........ G01C 21/36 701/490 |
| 2015/0317400 A1* | 11/2015 | Charkov | ............ G06Q 30/0639 707/724 |

FOREIGN PATENT DOCUMENTS

| | | |
|---|---|---|
| JP | 2011-003151 A | 1/2011 |
| JP | 2014134515 A | 7/2014 |
| JP | 2014-200007 A | 10/2014 |
| JP | 2017-045252 A | 3/2017 |

* cited by examiner

*Primary Examiner* — James M McPherson
*Assistant Examiner* — Tiffany P Ohman
(74) *Attorney, Agent, or Firm* — Hunton Andrews Kurth LLP (57) ABSTRACT

An information processing device includes a receiver configured to receive a first piece of position information from a terminal used by a first user, an acquisition unit configured to acquire one or more pieces of second position information posted on social media by a second user having a relationship through the social media with the first user based on the first piece of position information, and a transmitter configured to transmit the second piece of position information acquired by the acquisition unit to the terminal.

15 Claims, 8 Drawing Sheets

| VEHICLE ID | SNS USER ID |
|---|---|
| AAA | aaa |
| BBB | bbb |
| CCC | ccc |
| ⋮ | ⋮ |

FIG. 8

| SNS USER ID | NAME | DATE AND TIME | POSITION INFORMATION | LOCATION NAME | ADDITIONAL INFORMATION | ... |
|---|---|---|---|---|---|---|
| ... | ... | ... | ... | ... | ... | ... |

INFORMATION PROCESSING DEVICE, INFORMATION PROCESSING SYSTEM, METHOD OF PROCESSING INFORMATION, AND NON-TRANSITORY COMPUTER-READABLE RECORDING MEDIUM STORING PROGRAM

INCORPORATION BY REFERENCE

The disclosure of Japanese Patent Application No. 2017-171000 filed on Sep. 6, 2017 including the specification, drawings and abstract is incorporated herein by reference in its entirety.

BACKGROUND

1. Technical Field

The present disclosure relates to an information processing device, an information processing system, a method of processing information, and a non-transitory computer-readable recording medium storing a program.

2. Description of Related Art

In a related art, a technique of determining a point of interest (POI) similar to a POI related to POI information transmitted from a user as a recommend POI to the user is disclosed (for example, Japanese Unexamined Patent Application Publication No. 2011-003151 (JP 2011-003151 A)). In the related art, a similarity between the users (user similarity) is calculated based on behavior history information of a plurality of users including the POI information, and a similarity between the POIs (POI similarity) is calculated based on the user similarity. At the time, the user similarity between the users who visit the same POI is high, and the POI similarity between the POIs visited by the users with high user similarity is high.

SUMMARY

However, in the technique of JP 2011-003151 A, the user similarity is calculated based on simply visiting the same POI regardless of presence or absence of an interaction between persons, and a POI to be recommended is determined by the POI similarity based on the user similarity described above.

The present disclosure provides an information processing device, an information processing system, a method of processing information, and a non-transitory computer-readable recording medium storing a program capable of providing position information based on an interaction between persons.

A first aspect of the disclosure relates to an information processing device including a receiver, an acquisition unit, and a transmitter. The receiver is configured to receive a piece of first position information from a terminal used by a first user. The acquisition unit is configured to acquire one or more pieces of second position information posted on social media by a second user having a relationship through the social media with the first user based on the piece of first position information. The transmitter is configured to transmit the piece of second position information acquired by the acquisition unit to the terminal.

Therefore, the piece of second position information posted by the second user having the relationship with the first user on the social media is provided to the first user.

Accordingly, it is possible to provide the position information based on an interaction between persons.

In the information processing device according to the first aspect, the number of pieces of the second position information to be transmitted by transmitter to the terminal is limited to a preset threshold value or less.

In the information processing device according to the first aspect, the acquisition unit may acquire a piece of second position information related to a location within a predetermined range from a position indicated by the piece of first position information, among the one or more pieces of second position information posted on the social media by the second user.

Therefore, the piece of second position information outside the predetermined range of the position indicated by the position information related to the first user is excluded from a target to be provided.

Accordingly, it is possible to provide the piece of second position information for the first user with a high possibility of being useful.

In the information processing device according to the first aspect, the piece of first position information may be a piece of first position information of a current position of the terminal, a position designated by the first user on the terminal, or a position related to a location name included in information stored in the terminal.

Therefore, the piece of second position information outside the predetermined range of the position indicated by the position information related to the first user is excluded from the target to be provided.

Accordingly, it is possible to provide the second piece of position information for the first user with a high possibility of being useful.

In the information processing device according to the first aspect, the acquisition unit may acquire a piece of second position information posted by some of a plurality of the second users having a relationship through the social media with the first user, based on a similarity between a first piece of attribute information of the first user and each piece of second attribute information of each of the second users, among the one or more pieces of second position information posted on the social media by any of the second users.

Therefore, the piece of second position information posted by the second user having a similar attribute to the first user is provided.

Accordingly, it is possible to provide the piece of second position information that the first user is interested in with high possibility.

In the information processing device according to the first aspect, the acquisition unit may acquire the piece of second position information posted by the second user having the second piece of attribute information in which the similarity of the first piece of attribute information of the first user is equal to or larger than a predetermined index.

In the information processing device according to the first aspect, the attribute information may include preferences of the first user and the second user.

In the information processing device according to the first aspect, the acquisition unit may acquire a piece of second position information posted by some of a plurality of the second users having a relationship through the social media with the first user, based on a communication history with the first user on the social media, among the one or more pieces of second position information posted on the social media by any of the second users.

Therefore, the piece of second position information posted by the second user having a large number of times of communication with the first user is provided.

Accordingly, it is possible to provide the piece of second position information that the first user is interested in with high possibility.

In the information processing device according to the first aspect, the acquisition unit may acquire information posted accompanying the piece of second position information. The transmitter may transmit the piece of second position information acquired by the acquisition unit and information posted accompanying the piece of second position information to the terminal.

Therefore, the information posted accompanying together with the piece of second position information is provided to the first user.

Accordingly, it is possible to provide detailed information relating to the piece of second position information to the first user.

In the information processing device according to the first aspect, the terminal may be an on-vehicle apparatus mounted on a vehicle.

Therefore, the piece of second position information posted by the second user having the relationship with a driver or the like of the vehicle in the social media is provided to the driver or the like.

Accordingly, it is possible to provide the position information based on an interaction between persons.

A second aspect of the disclosure relates to an information processing system including an information processing device that is communicable with a terminal used by a first user through a network, and the terminal. The information processing device includes a receiver that receives a piece of first position information from the terminal, an acquisition unit that acquires one or more pieces of second position information posted on social media by a second user having a relationship through the social media with the first user based on the piece of first position information, and a transmitter that transmits the piece of second position information acquired by the acquisition unit to the terminal.

Therefore, the piece of second position information posted by the second user having the relationship with the first user in the social media is provided to the first user.

Accordingly, it is possible to provide the position information based on an interaction between persons.

A third aspect of the disclosure relates to a method of processing information. The method includes receiving a piece of first position information by an information processing device from a terminal used by a first user, acquiring one or more pieces of second position information by the information processing device, the pieces of second position information being posted on social media by a second user having a relationship through the social media with the first user based on the piece of first position information, and transmitting the piece of second position information by the information processing device to the terminal.

Therefore, the piece of second position information posted by the second user having the relationship with the first user in the social media is provided to the first user.

Accordingly, it is possible to provide the position information based on an interaction between persons.

A fourth aspect of the disclosure relates to a non-transitory computer-readable recording medium storing a program executed by a computer. The program includes receiving a piece of first position information by an information processing device from a terminal used by a first user, acquiring one or more pieces of second position information by the information processing device, the pieces of second position information being posted on social media by a second user having a relationship through the social media with the first user based on the piece of first position information, and transmitting the piece of second position information by the information processing device to the terminal.

Therefore, the piece of second position information posted by the second user having the relationship with the first user in the social media is provided to the first user.

Accordingly, it is possible to provide the position information based on an interaction between persons.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
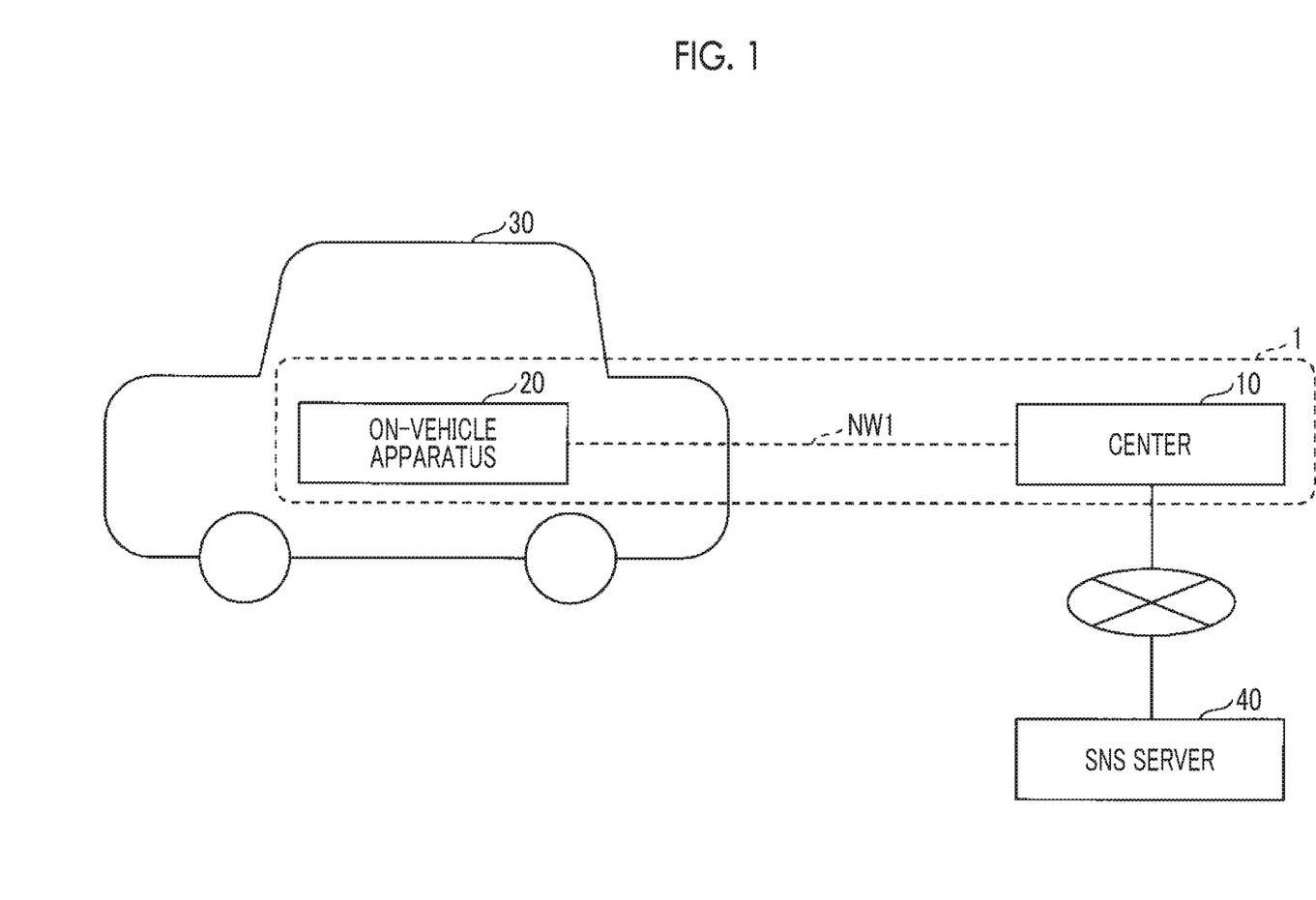
FIG. 1 is a diagram illustrating a configuration example of an information processing system 1 according to an embodiment.

Hereinafter, an embodiment will be described based on drawings. FIG. 1 is a diagram illustrating a configuration example of an information processing system 1 according to the embodiment. In FIG. 1, the information processing system 1 includes an on-vehicle apparatus 20 and a center 10. The on-vehicle apparatus 20 and the center 10 can communicate with each other through a predetermined communication network NW1 including a mobile communication network which is a wireless communication network with a plurality of base stations as a terminal, an internet network, and the like. FIG. 1 illustrates solely one on-vehicle apparatus 20 for convenience, each on-vehicle apparatus 20 of a plurality of vehicles 30 can communicate with the center 10 through the communication network NW1.

The on-vehicle apparatus 20 is mounted on the vehicle 30 and is a device having an information processing function and a communication function. For example, the on-vehicle apparatus 20 may include a navigation system. In the embodiment, the on-vehicle apparatus 20 transmits position information on a current position of the vehicle 30 to the center 10. The on-vehicle apparatus 20 receives recommendation information for the current position of the vehicle 30 transmitted from the center 10 based on the position information and outputs (displays) the recommendation information. The recommendation information for the current position of the vehicle 30 means information indicating a location where the interest or a preference of an occupant such as a driver of the vehicle 30 (hereinafter, referred to as "vehicle user") is presumed to be matched among locations such as facilities around the current position.

The center 10 is a set of one or more computers (information processing device). In the embodiment, the center 10 receives position information from the on-vehicle apparatus 20 of the vehicle 30 and transmits recommendation information for a position related to the position information to the on-vehicle apparatus 20.

In FIG. 1, the center 10 is connected to a social networking service (SNS) server 40 through a network such as the Internet. The SNS server 40 is one or more computers that provide an SNS. Various postings by each user of the SNS, a comment from another user for each posting, and the like are uploaded to the SNS server 40. A posting including information indicating a location (place) visited by the user (hereinafter, referred to as "location posting information") is included in the various postings. The location posting information is used for generating the recommendation information by the center 10. Specifically, the center 10 uses all or a part of the location posting information from a person having a relationship through the SNS with the vehicle user who is a transmission source of the position information among a location posting information group as the recommendation information. That is, the recommendation information is a set of pieces of location posting information from the person having the relationship through the SNS with the vehicle user. Accordingly, the recommendation information may also be referred to as a visit history of the person having the relationship through the SNS with the vehicle user.

The person having the relationship through the SNS with the vehicle user is an SNS user in which a friendship with the vehicle user is defined, an SNS user belonging to the same group (for example, the same community) as the vehicle user in the SNS, and the like among the users of the SNS (hereinafter, referred to as "SNS user"). Alternatively, the person having the relationship through the SNS with the vehicle user may include an SNS user who posts a comment on a posting of the vehicle user in the SNS, an SNS user who receives a comment from the vehicle user, and the like.

Figure 2:
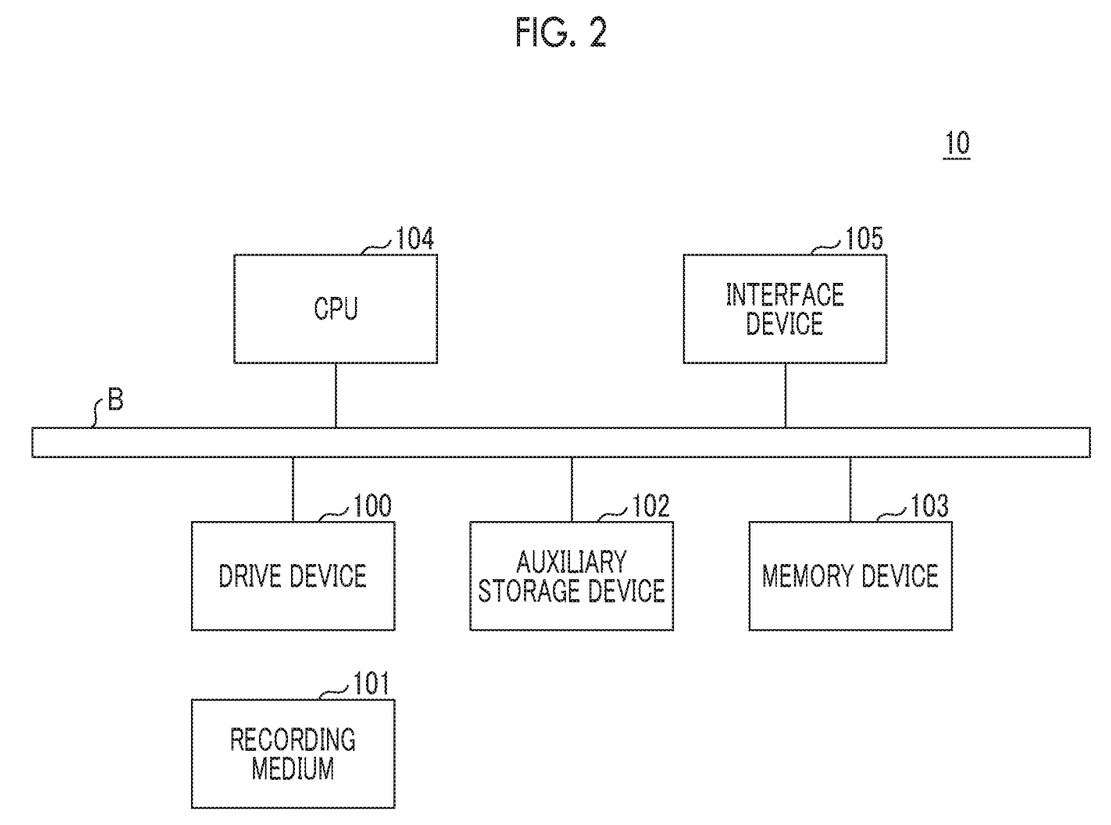
FIG. 2 is a diagram illustrating a hardware configuration example of a center 10 according to the embodiment.

FIG. 2 is a diagram illustrating a hardware configuration example of the center 10 according to the embodiment. The center 10 of FIG. 2 includes a drive device 100, an auxiliary storage device 102, a memory device 103, a central processing unit (CPU) 104, an interface device 105, and the like which are mutually connected through a bus B.

A program that realizes processing in the center 10 is provided by a recording medium 101 such as a compact disc read only memory (CD-ROM). When the recording medium 101 storing the program is set in the drive device 100, the program is installed from the recording medium 101 to the auxiliary storage device 102 through the drive device 100. However, the program is not always needed to be installed by the recording medium 101 and may be downloaded by another computer through the network. The auxiliary storage device 102 stores the installed program, a needed file, data, and the like.

In a case where there is an activation instruction of the program, the memory device 103 reads the program from the auxiliary storage device 102 and stores the program. The CPU 104 executes a function related to the center 10 according to the program stored in the memory device 103. The interface device 105 is used as an interface for connecting to the network.

Figure 3:
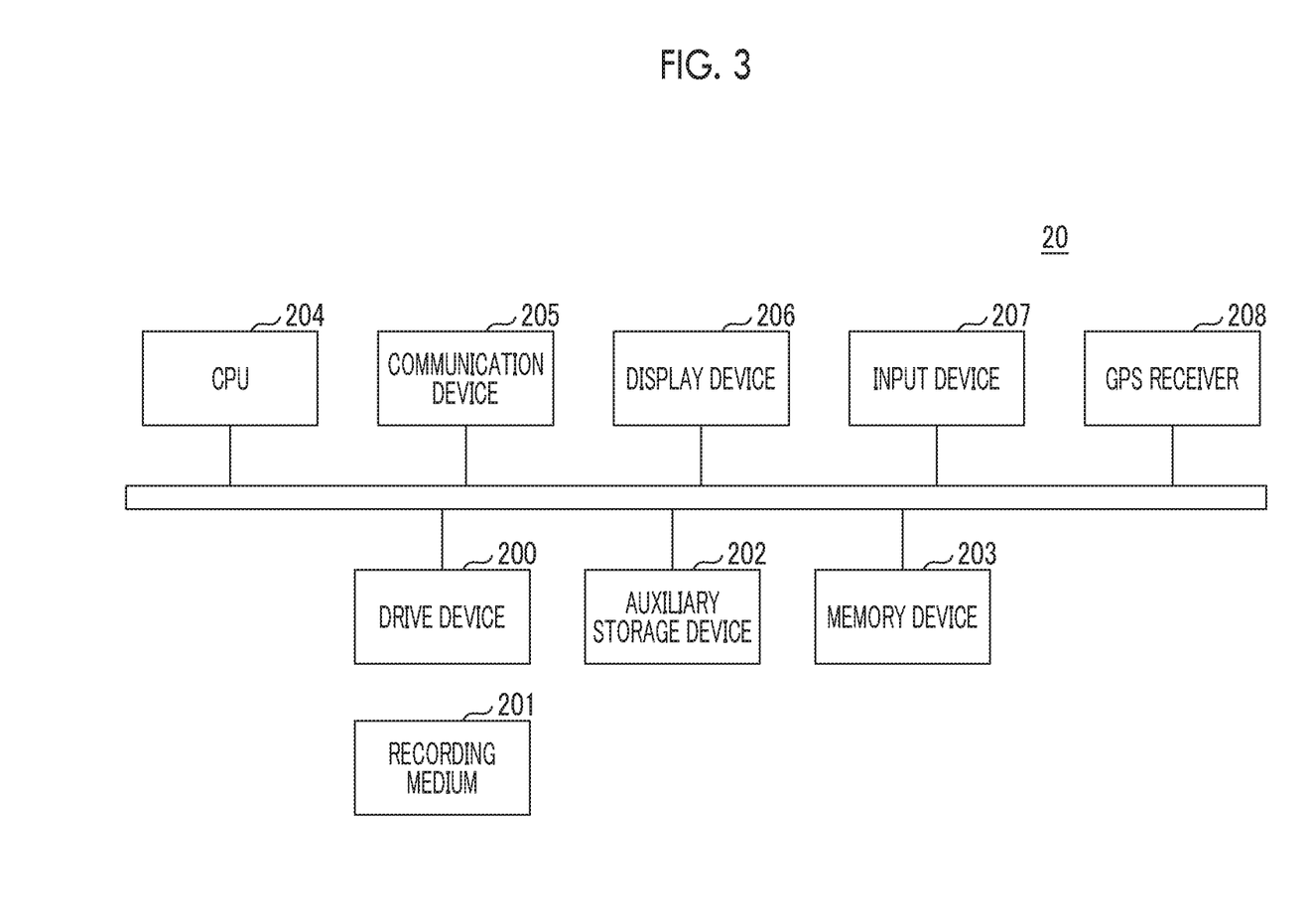
FIG. 3 is a diagram illustrating a hardware configuration example of an on-vehicle apparatus 20 according to the embodiment.

FIG. 3 is a diagram illustrating a hardware configuration example of an on-vehicle apparatus 20 according to the embodiment. The on-vehicle apparatus 20 of FIG. 3 includes a drive device 200, an auxiliary storage device 202, a memory device 203, a CPU 204, a communication device 205, a display device 206, an input device 207, a global positioning system (GPS) receiver 208, and the like.

A program that realizes processing in the on-vehicle apparatus 20 is provided by a recording medium 201 such as a secure digital (SD) memory card. When the recording medium 201 storing the program is set in the drive device 200, the program is installed from the recording medium 201 to the auxiliary storage device 202 through the drive device 200. However, the program is not always needed to be installed by the recording medium 201 and may be downloaded by another computer through the network. The auxiliary storage device 202 stores the installed program, a needed file, data, and the like.

In a case where there is an activation instruction of the program, the memory device 203 reads the program from the auxiliary storage device 202 and stores the program. The CPU 204 executes a function related to the on-vehicle apparatus 20 according to the program stored in the memory device 203. The communication device 205 is a device for connecting to the network by wireless communication. The communication device 205 may be realized using, for example, a data communication module (DCM). The display device 206 is, for example, a liquid crystal display or the like and displays a graphical user interface (GUI) and the like by the program. The input device 207 is used for inputting various operation instructions from the user. For example, the input device 207 may be a touch panel. The GPS receiver 208 receives a GPS signal transmitted from a GPS satellite and measures the current position of the vehicle 30 based on the GPS signal.

Figure 4:
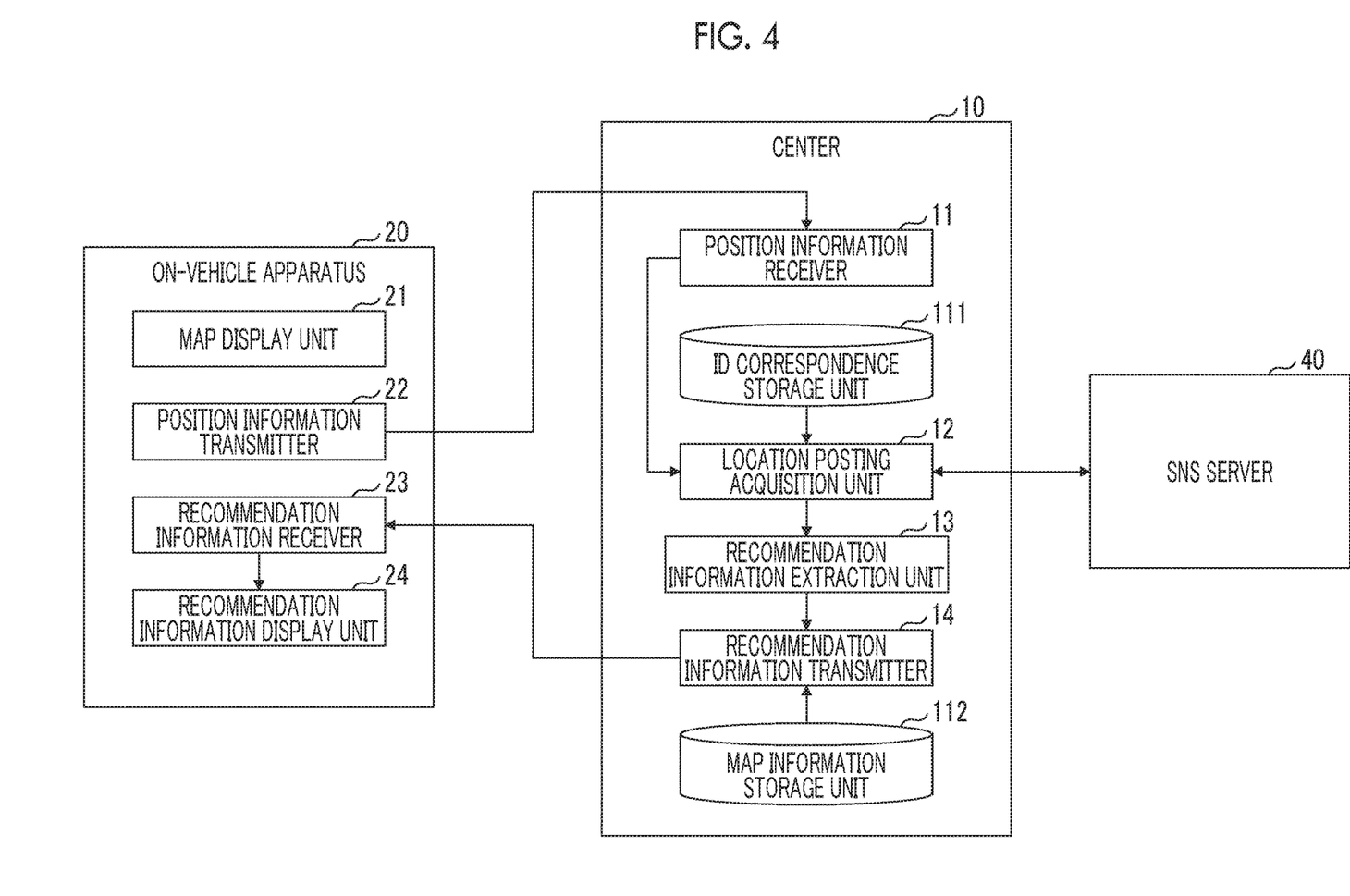
FIG. 4 is a diagram illustrating a functional configuration example of the on-vehicle apparatus 20 and the center 10 according to the embodiment.

FIG. 4 is a diagram illustrating a functional configuration example of the on-vehicle apparatus 20 and the center 10 according to the embodiment. In FIG. 4, the on-vehicle apparatus 20 includes a map display unit 21, a position information transmitter 22, a recommendation information receiver 23, a recommendation information display unit 24, and the like. Each of units and the like described above is realized by executing the one or more programs installed in the on-vehicle apparatus 20 by the CPU 204.

The map display unit 21 displays a map around the current position of the vehicle 30 (on-vehicle apparatus 20) or a map around a position designated by the vehicle user on the display device 206. The position information transmitter 22 transmits the position information of the current position of the vehicle 30 (on-vehicle apparatus 20) and a vehicle ID to the center 10. The recommendation information receiver 23 receives the recommendation information acquired by the center 10 based on the position information and the like transmitted by the position information transmitter 22 from the center 10. The recommendation information display unit 24 displays the recommendation information received by the recommendation information receiver 23 on the display device 206.

The center 10 includes a position information receiver 11, a location posting acquisition unit 12, a recommendation information extraction unit 13, a recommendation information transmitter 14, and the like. Each of units and the like described above is realized by executing the one or more programs installed in the center 10 by the CPU 204. The center 10 uses an ID correspondence storage unit 111, a map information storage unit 112, and the like. Each of the storage units described above can be realized using, for example, a storage device or the like capable of connecting to the auxiliary storage device 102 or the center 10 through the network.

The position information receiver 11 receives the position information and the vehicle ID which are transmitted from the on-vehicle apparatus 20. The location posting acquisition unit 12 acquires one or more pieces of location posting information posted by the SNS user having the relationship through the SNS with the vehicle user related to the vehicle ID received by the position information receiver 11 from the SNS server 40. The recommendation information extraction unit 13 extracts the location posting information as the recommendation information among the pieces of location posting information acquired by the location posting acquisition unit 12. The recommendation information transmitter 14 transmits the recommendation information extracted by the recommendation information extraction unit 13 to the on-vehicle apparatus 20 which is the transmission source of the position information.

The ID correspondence storage unit 111 stores a user ID in the SNS of the vehicle user related to the vehicle ID for each vehicle ID. The map information storage unit 112 stores map information used in the navigation system or the like. The map information includes POI information including POI_ID, name, category (for example, genre), position information (for example, latitude and longitude) for each POI of a store, a facility, or the like.

Figure 5:
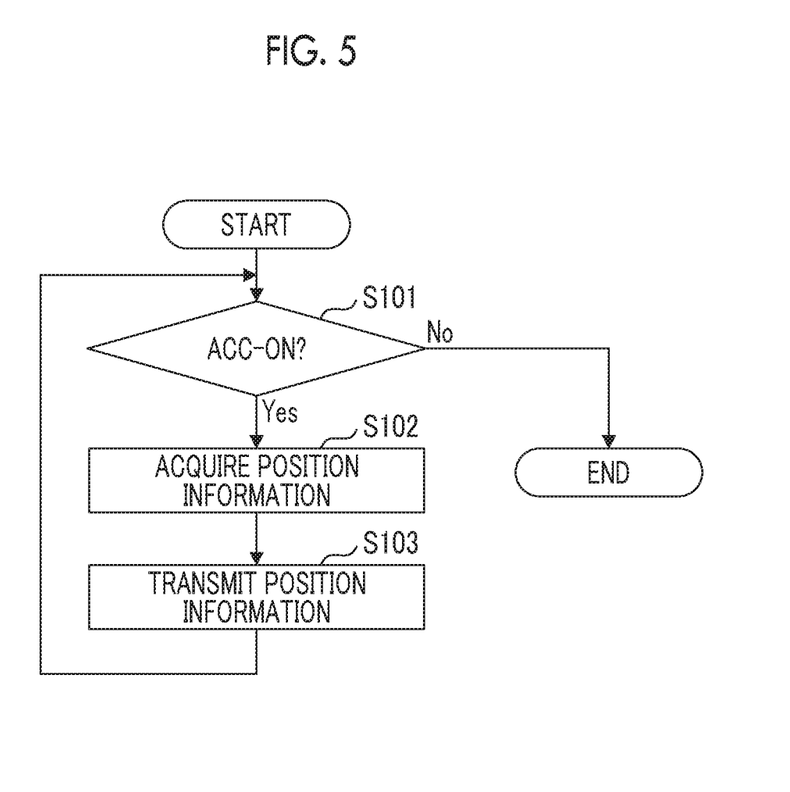
FIG. 5 is a flowchart for describing an example of a processing procedure of transmission processing of position information executed by the on-vehicle apparatus 20.

Hereinafter, a processing procedure executed in the information processing system 1 will be described. FIG. 5 is a flowchart for describing an example of the processing procedure of transmission processing of the position information executed by the on-vehicle apparatus 20.

For example, when an accessory power supply of the vehicle 30 is turned on by an operation by the vehicle user (Yes in S101), the position information transmitter 22 acquires the position information (for example, latitude and longitude) of the current position of the vehicle 30 from the GPS receiver 208 (S102). The position information transmitter 22 transmits the position information to the center 10 (S103). At the time, the position information includes identification information of the vehicle user (hereinafter, referred to as "vehicle ID"). The vehicle ID may be an ID for each vehicle 30. Steps S102 and S103 are repeated, for example, until the accessory power supply is turned off (No in S101).

The position information may be transmitted for each predetermined interval. The predetermined interval may be prescribed based on an elapsed time or a movement distance of the vehicle 30. That is, steps S102 and S103 are continuously executed also during traveling of the vehicle 30. Accordingly, different position information is transmitted to the center 10 accompanied by the movement of the vehicle 30.

At a time when a predetermined operation is performed by the vehicle user through the input device 207, position information indicating a position of the vehicle 30 at the time may be transmitted.

Figure 6:
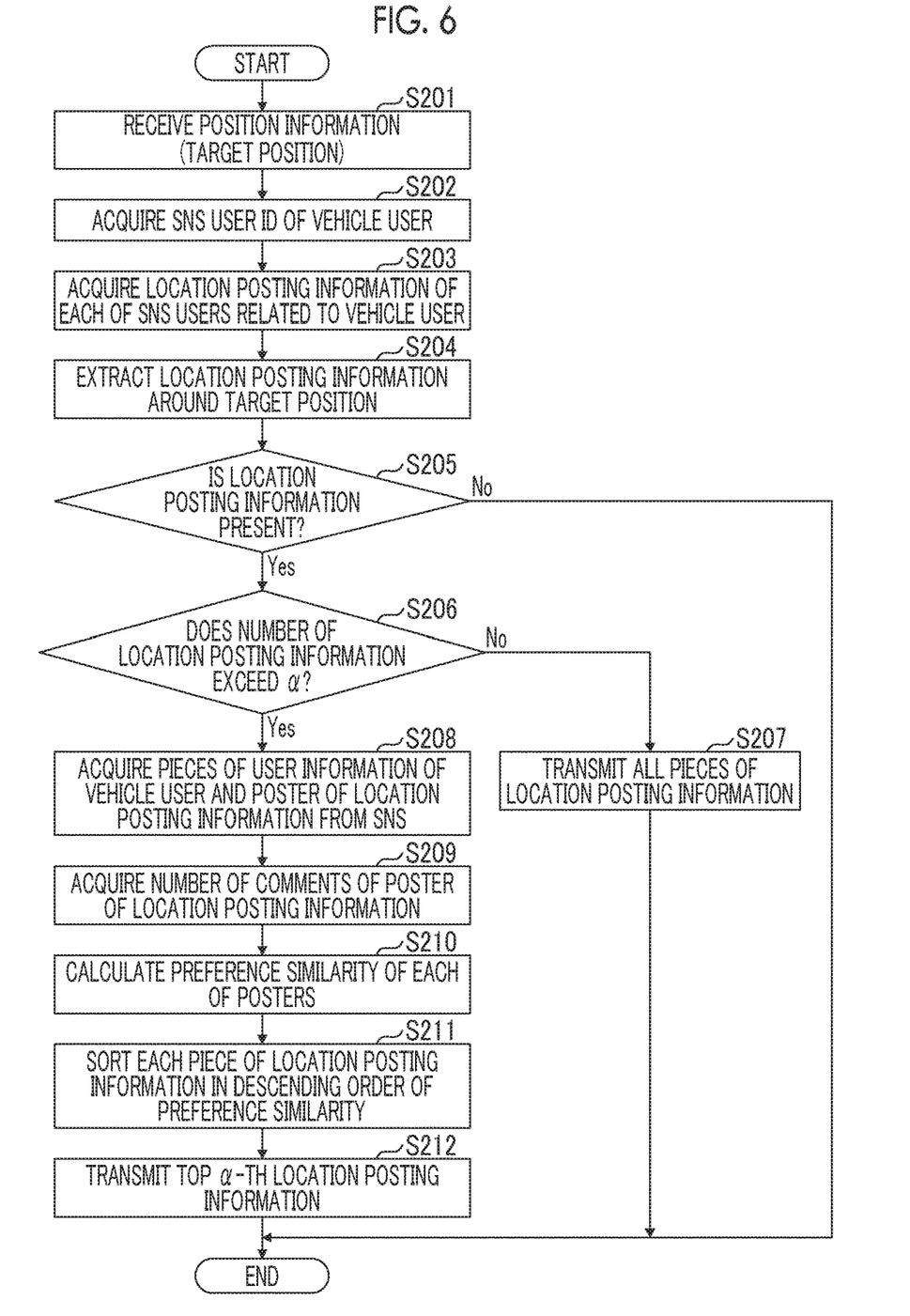
FIG. 6 is a flowchart for describing an example of a processing procedure executed by the center 10 according to reception of the position information.

A processing procedure executed by the center 10 according to reception of the position information transmitted from the vehicle 30 will be described. FIG. 6 is a flowchart for describing an example of the processing procedure executed by the center 10 according to the reception of the position information. The processing procedure of FIG. 6 is executed each time the position information is transmitted from the vehicle 30.

When the position information receiver 11 receives (acquires) the position information (S201), the location posting acquisition unit 12 acquires a user ID in the SNS (hereinafter, referred to as "SNS user ID") corresponding to a vehicle ID (hereinafter, referred to as "target vehicle ID") assigned to the position information (hereinafter, referred to as "vehicle position information") from the ID correspondence storage unit 111 (S202). That is, the target vehicle ID is converted into the SNS user ID.

Figure 7:
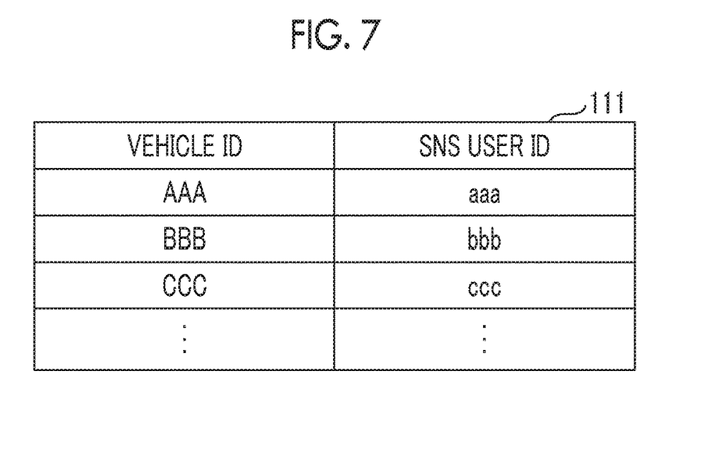
FIG. 7 is a table indicating a configuration example of an identifier (ID) correspondence storage unit 111.

FIG. 7 is a table indicating a configuration example of the ID correspondence storage unit 111. As indicated in FIG. 7, the ID correspondence storage unit 111 stores the SNS user ID corresponding to the vehicle ID in correlation with the vehicle ID. The SNS user ID corresponding to the vehicle ID is a user ID which is used by a user related to the vehicle ID in the SNS. That is, the correlated vehicle ID and the SNS user ID are IDs for the same person. Hereinafter, the SNS user ID acquired in step S202 is referred to as "target SNS user ID".

The location posting acquisition unit 12 acquires a set of one or more pieces of location posting information (hereinafter, referred to as "location posting information group") posted and disclosed by one or more other SNS users having the relationship with the SNS user related to the target SNS user ID from the SNS server 40 (S203). For example, the location posting acquisition unit 12 acquires SNS user IDs of other SNS users having the relationship with the SNS user related to the target SNS user ID from the SNS server 40. The location posting acquisition unit 12 acquires location posting information disclosed to other persons among pieces of location posting information posted in the past by the SNS user related to each acquired SNS user ID from the SNS server 40. The location posting information disclosed to other persons is location posting information that reference or browsing by other persons is permitted by a poster. The disclosure of the location posting information is realized by a function such as check-in depending on an SNS, but there are various functions to disclose the location posting information depending on an SNS type. The acquired location posting information may be limited to location posting information posted in a predetermined period retroactively from the present time to the past. A method of acquiring the location posting information group depends on an application program interface (API) or the like disclosed by an SNS which is an acquisition destination. Accordingly, the location posting information group may be acquired by a procedure other than the procedure described above.

Figure 8:
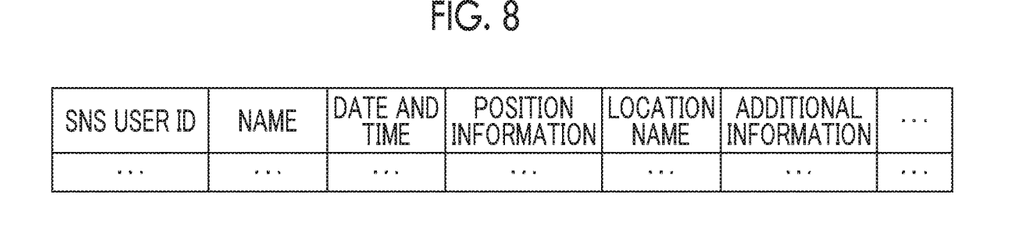
FIG. 8 is a table indicating an example of location posting information.

FIG. 8 is a table indicating an example of the location posting information. As indicated in FIG. 8, one location posting information includes a value (data) of each item such as "SNS user ID", "name", "date and time", "position information", "location name", and "additional information".

The "SNS user ID" is an SNS user ID of the SNS user who is the poster of the location posting information. The "name" is a name of the SNS user. The "date and time" is date and time when the location posting information is posted. The "position information" is position information (for example, latitude and longitude) of a location where the location posting information is posted. For example, in a case where the location posting information is posted using a portable terminal with a GPS function such as a smartphone, the portable terminal can include position information acquired by using the GPS function in the location posting information. The "location name" is a name of the location where the location posting information is posted (for example, place or facility). The "additional information" is a text message assigned by the poster, image data captured in the location, and the like.

A configuration of the location posting information may be different depending on a SNS type or a poster. Accordingly, location posting information different from the configuration indicated in FIG. 8 may be acquired. For example, the location posting information not including the "location name" may be acquired.

The recommendation information extraction unit 13 extracts location posting information posted in a range around a position related to the vehicle position information (hereinafter, referred to as "vehicle position") from among the location posting information group acquired by the location posting acquisition unit 12 (S204). For example, location posting information including the "position information" in a range of a predetermined distance in all directions from the vehicle position, in a range within radius R (a value of R is predetermined) km with the vehicle position as the center, or the like may be extracted. As a result, it is possible to exclude location posting information relating to a location far away from the vehicle position and to extract location posting information for the vehicle user with a high possibility of being useful.

In a case where there is no extracted location posting information (No in S205), the processing procedure of FIG. 6 ends. In a case where one or more pieces of location posting information are extracted (Yes in S205), the recommendation information extraction unit 13 determines whether the number of extracted pieces of location posting information (hereinafter, referred to as "recommendation candidate information") exceeds a threshold value α set in advance. The value of threshold value α may be set randomly by an administrator or the like of the center 10 as long as the value can prevent the enormous number of pieces of location posting information from being transmitted to the on-vehicle apparatus 20.

In a case where the number of pieces of recommendation candidate information is equal to or less than the threshold value α (No in S206), the recommendation information transmitter 14 transmits all the pieces of recommendation candidate information to the on-vehicle apparatus 20 which is the transmission source of the vehicle position information (S207). That is, in the case described above, all the extracted location posting information is set as the recommendation information.

On the other hand, in a case where the number of pieces of recommendation candidate information exceeds the threshold value α (Yes in S206), the recommendation information extraction unit 13 acquires user information of the vehicle user and user information of a poster of each piece of recommendation candidate information from the SNS server 40 (S208). That is, the recommendation information extraction unit 13 acquires the user information corresponding to the target SNS user ID and the user information corresponding to the SNS user ID of each piece of recommendation candidate information from the SNS server 40. The user information is information managed in the SNS server 40 as attribute information of the SNS user. The user information includes, for example, age, gender, group name, workplace, business type, address, birthplace, graduating university, hobby, and the like. The group name is a name of a group (for example, community) formed in the SNS. The workplace is a name of a company or the like which is the workplace of the SNS user. The business type is a business type to which the workplace of the SNS user belongs. The address is a home address of the SNS user. The birthplace is a prefecture name of the birthplace of the SNS user. The graduating university is a name of the graduating university of the SNS user. The hobby is a hobby of the SNS user. Among the acquired pieces of user information, the user information of the target SNS user (that is, vehicle user related to the on-vehicle apparatus 20 which is the transmission source of the position information) is hereinafter referred to as "vehicle user information", and the user information (that is, user information of the poster of the recommendation candidate information) other than the vehicle user information is hereinafter referred to as "related user information".

The recommendation information extraction unit 13 acquires the number of posted comments (hereinafter, referred to as "the number of comments") on the posting to the SNS by the vehicle user for each SNS user related to the related user information from the SNS server 40 (S209). Since the comments from other SNS users on the posting by each SNS user are managed in the SNS server 40, it is possible to easily acquire the number of comments.

The recommendation information extraction unit 13 calculates a preference similarity to the vehicle user for the SNS user which is the poster of each recommendation candidate information (that is, SNS user related to each piece of related user information) based on the vehicle user information, each piece of related user information, the number of comments of the poster of each piece of recommendation candidate information (S210).

The preference similarity is an index indicating a degree to which the preference is similar or common and indicates that the larger a value of the preference similarity, the higher the similarity or commonality of the preference. For example, the preference similarity for one certain SNS user is calculated by the following equation (1).

$$\text{preference similarity} = w1 \times \text{the number of comments} + w2 \times \text{workplace common term} + w3 \times \text{business type common term} + w4 \times \text{residential area common term} + w5 \times \text{gender common term} + w6 \times \text{generation common term} \quad (1)$$

Here, the workplace common term is one in a case where the workplace is the same as the vehicle user and is zero in a case where the workplace is different. The business type common term is one in a case where the business type is the same as the vehicle user and is zero in a case where the business type is different. The residential area common term is one in a case where the prefecture name of the address is the same as the vehicle user and is zero in a case where the prefecture name of the address is different. The gender common term is one in a case where the gender is the same as the vehicle user and is zero in a case where the gender is different. The generation common term is one in a case where the generation is the same as the vehicle user and is zero in a case where the generation is different. The same generation may be, for example, that values of the tens place of the age coincide or a difference between one age and the other age is within a predetermined value (for example, within 10). The w1 to w6 are weight coefficients. The weight coefficient may be set randomly.

According to equation (1), the more the number of comments, the higher the preference similarity. The above description means that the preference similarity is calculated based on a history of a dialogue (communication) in the SNS. In the above description, the possibility that the preference is similar or common is considered to be high as the number of dialogues (communication) in the SNS increases. In other words, since the preference is similar or common, the number of dialogues (communication) in the SNS is considered to be increased. The number of comments may be a value in a predetermined period retroactively from the present time to the past or a value over the entire period.

According to equation (1), the more similar or common the attribute of the SNS user such as workplace, business type, residential area (for example, address), gender, and generation, the higher the preference similarity. In the above description, persons with high similarity or commonality of the attribute are considered to have a tendency for the preference to be similar or common.

Differences in the workplace, the business type, the prefecture name of the address, the gender, and the generation can be determined by comparing the vehicle user information with the related user information.

The residential area common term and the generation common term may not be always zero or one. For example, the residential area common term may be a value based on the number of characters of a common part of the address. The generation common term may be a value based on the reciprocal of the difference in the age.

Another term may be added. For example, whether there is a family member, whether the hobby is common, or the like may be reflected in the preference similarity. Whether there is a family member may be determined based on whether the address is the same.

The recommendation information extraction unit 13 sorts each piece of recommendation candidate information in a descending order of the preference similarity calculated for the posters of the recommendation candidate information (S211). The recommendation information transmitter 14 transmits recommendation candidate information up to top α-th in the sorting order to the on-vehicle apparatus 20 which is the transmission source of the vehicle position information (S212). That is, the recommendation candidate information up to top α-th is set as the recommendation information. Here, the preference similarity is an index indicating the similarity of the preference. Accordingly, it is possible to expect to provide the recommendation information with a high possibility that the vehicle user is interested in by setting the recommendation candidate information with higher preference similarity as the recommendation information.

At timings of steps S207 and S211, for the recommendation information not including a location name among the pieces of recommendation information to be transmitted, the recommendation information transmitter 14 may specify the location name with reference to the map information storage unit 112 to assign the location name to the recommendation information. For example, the recommendation information transmitter 14 may acquire POI information corresponding to position information of the recommendation information not including the location name from the map information storage unit 112 to assign a name included in the POI information to the recommendation information as the location name.

Figure 9:
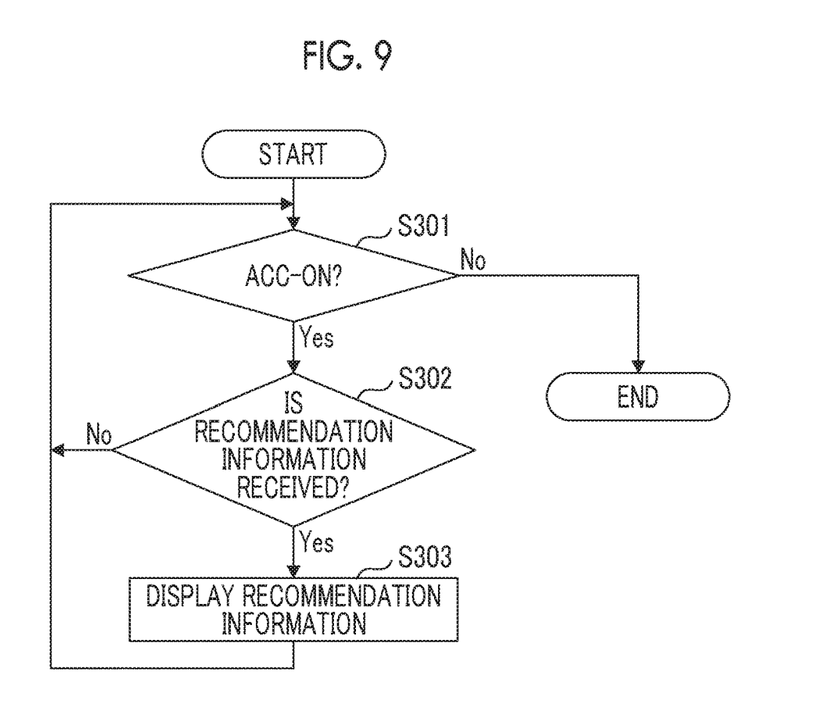
FIG. 9 is a flowchart for describing an example of a processing procedure executed by the on-vehicle apparatus 20 according to reception of recommendation information.

A processing procedure executed by the on-vehicle apparatus 20 according to the reception of the recommendation information will be described. FIG. 9 is a flowchart for describing an example of the processing procedure executed by the on-vehicle apparatus 20 according to the reception of the recommendation information.

When the accessory power supply of the vehicle 30 is turned on by the operation by the vehicle user (Yes in S301), the recommendation information receiver 23 waits for the reception of the recommendation information from the center 10 (S302). When the recommendation information receiver 23 receives the recommendation information transmitted from the center 10 (Yes in S302), the recommendation information display unit 24 displays the recommendation information in a superimposed manner on a map displayed by the map display unit 21 (S303). Steps S302 and S303 are repeated, for example, until the accessory power supply is turned off (No in S301).

Figure 10:
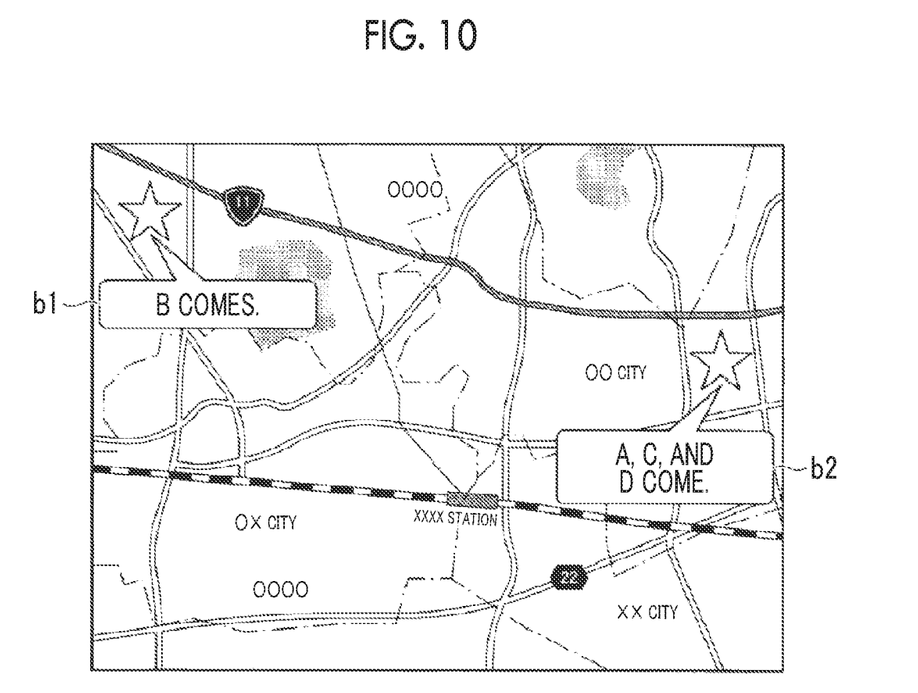
FIG. 10 is a diagram illustrating a display example of the recommendation information.

FIG. 10 is a diagram illustrating a display example of the recommendation information. As illustrated in FIG. 10, for example, each piece of recommendation information is displayed in correlation with a POI position corresponding to position information or a location name of the recommendation information on the map displayed on the display device 206 by the map display unit 21. In the example of FIG. 10, a predetermined graphic ("☆" in FIG. 10) is superimposed on the POI position to which each piece of recommendation information corresponds and a message "XXX comes." is displayed in a balloon b1 or b2 for the predetermined graphic on the map. Here, a name included in the corresponding recommendation information is applied to the part of "XXX". As illustrated in the balloon b2, the pieces of recommendation information corresponding to the same POI may be collectively displayed in one balloon.

The vehicle user can enjoy driving by stopping by a location related to the recommendation information or selecting the location as a destination with reference to the recommendation information displayed as illustrated in FIG. 10.

A display form of the recommendation information is not limited to the form illustrated in FIG. 10. For example, the recommendation information display unit 24 may display a list of the recommendation information received by the recommendation information receiver 23 in a menu format or the like at a predetermined position on the display device 206 of the on-vehicle apparatus 20. The recommendation information selected by the vehicle user from the list may be displayed as illustrated in FIG. 10. In the case described above, a display order of the pieces of recommendation information in the list may be in accordance with the sorting order (that is, descending order of the preference similarity) in step S211 of FIG. 6. Therefore, the recommendation information transmitter 14 of the center 10 may transmit the recommendation information to the on-vehicle apparatus 20 in a state of being arranged in the sorting order or may assign the preference similarity to each piece of recommendation information to transmit each piece of recommendation information to the on-vehicle apparatus 20. The preference similarity is calculated in the case where the number of pieces of recommendation candidate information exceeds the threshold value α in the example illustrated in FIG. 6. However, even in a case where the number of pieces of recommendation candidate information is equal to or less than the threshold value α, step S207 may be executed after steps S208 to S211 are executed.

The additional information (for example, text message and image data) included in the recommendation information may be displayed. For example, the recommendation information displayed as in FIG. 10 or the additional information of the recommendation information selected by the vehicle user from the list may be displayed. In the manner as described above, the vehicle user can obtain detail information by other persons having the relationship through the SNS for a POI corresponding to specific recommendation information.

In the above description, the position information during the traveling of the vehicle 30 is automatically transmitted to the center 10, and the location posting information relating to the location around the position related to the position information is the candidate of the recommendation information. However, the position information which is an extraction source of the location posting information may not be limited to the position information of the current position of the vehicle 30. For example, when the vehicle user sets a destination using the navigation function of the on-vehicle apparatus 20, the position information transmitter 22 may transmit position information of the destination as the position information to be processed of FIG. 6 to the center 10. In the manner as described above, the vehicle user can obtain the recommendation information around the destination in advance.

The position information transmitter 22 may transmit position information of a predetermined location selected by the vehicle user on the map displayed by the map display unit 21 as the position information to be processed of FIG. 6 to the center 10. In the manner as described above, the vehicle user can obtain the recommendation information around the predetermined location, and, for example, can obtain reference information when the user is not sure about selection of the destination.

In the above description, the on-vehicle apparatus 20 is the terminal that receives the recommendation information from the center 10. However, the embodiment may be employed in a terminal carried by a person such as smartphone and tablet terminal. That is, the terminal described above may have the functional configuration of the on-vehicle apparatus 20 illustrated in FIG. 4. In the case described above, the position information transmitter 22 of the terminal may transmit position information measured by the GPS function of the terminal, position information of a destination selected by the user in a navigation application of the terminal, position information of a location selected by the user in a map application of the terminal, and the like to the center 10. A location name included in information stored in the terminal may be used. For example, when the terminal has a calendar function (schedule function) and a location name is included in a schedule registered in the calendar function, the position information transmitter 22 of the terminal may transmit position information corresponding to the location name to the center 10. In a case where a driving schedule or another piece of schedule information is stored, position information related to a location name included in the schedule information may be transmitted to the center 10 also for the on-vehicle apparatus 20.

In the above description, the embodiment in the case of using the SNS as an example of social media is indicated. However, the embodiment may be employed in other social media other than the SNS and capable of acquiring the relationship between the users.

According to the embodiment, as described above, it is possible to display the recommendation information around the position related to the position information transmitted by the on-vehicle apparatus 20 or a mobile terminal such as the portable terminal to the center 10 at a predetermined timing on the mobile terminal. Here, the recommendation information is information relating to a location where a user who uses the mobile terminal and other persons having the relationship through the social media such as SNS actually visit. Accordingly, according to the embodiment, it is possible to provide the position information (for example, location posting information) based on an interaction between the persons. As a result, it is possible to expect to provide the recommendation information matching the preference of the vehicle user. It is possible to give the vehicle user an opportunity to share an experience with other SNS users having the interaction.

In the embodiment, the center 10 is an example of the information processing device. The on-vehicle apparatus 20 is an example of the terminal. The position information transmitted from the on-vehicle apparatus 20 is an example of a piece of first position information. The location posting information and the recommendation information are examples of a piece of second position information. The vehicle user is an example of a first user. The SNS user having the relationship with the vehicle user is an example of a second user. The position information receiver 11 is an example of the receiver. The location posting acquisition unit 12 and the recommendation information extraction unit 13 are an example of the acquisition unit. The recommendation information transmitter 14 is an example of the transmitter.

The embodiment is described in details. The disclosure is not limited to the specific embodiment described above, and various modifications and changes are possible within the scope of the gist described in the claims.

What is claimed is:

1. An information processing system comprising one or more computers wherein the one or more computers are connected via a first network to an on-vehicle apparatus and via a second network to a social networking service (SNS) server, and the one or more computers comprise at least a central processing unit (CPU), the CPU being programmed to:
   receive, via the first network, a piece of first position information from the on-vehicle apparatus used by a first user, wherein the on-vehicle apparatus is mounted on a vehicle including an accessory power supply, and the piece of first position information includes position information of the vehicle generated from a global positioning system (GPS) of the on-vehicle apparatus upon turning on the accessory power supply by the first user;
   acquire, via the second network, one or more pieces of second position information posted on the social networking service (SNS) server by a second user having a relationship through the social networking service (SNS) server with the first user based on the piece of first position information; and
   transmit, via the first network, the one or more pieces of second position information to the on-vehicle apparatus,
   wherein the one or more pieces of second position information is displayed including a predetermined graphic and superimposed on a corresponding point of interest (POI) position on the GPS of the on-vehicle apparatus to guide the first user for driving the vehicle to the POI position.

2. The information processing system according to claim 1, wherein a number of the one or more pieces of second position information to be transmitted to the on-vehicle apparatus is limited to a preset threshold value.

3. The information processing system according to claim 1, wherein the CPU is further programmed to acquire a piece of second position information of the one or more pieces of second position information related to a location within a predetermined range from a position indicated by the piece of first position information, among the one or more pieces of second position information posted on the social networking service (SNS) server by the second user.

4. The information processing system according to claim 1, wherein the piece of first position information is a current position of the on-vehicle apparatus, a position designated by the first user on the on-vehicle apparatus, or a position related to a location name included in information stored in the on-vehicle apparatus.

5. The information processing system according to claim 1, wherein the CPU is further programmed to acquire a piece of second position information of the one or more pieces of second position information posted by any of a plurality of the second users having the relationship through the social networking service (SNS) server with the first user, based on a preference similarity between a first attribute information of the first user and each second attribute information of each of the second users, among the one or more pieces of second position information posted on the social networking service (SNS) server by the second users.

6. The information processing system according to claim 5, wherein the CPU is further programmed to acquire the piece of second position information posted by the some of the second users having the second attribute information in which the preference similarity of the first attribute information of the first user and each second attribute information of each of the second users is equal to or larger than a predetermined index.

7. The information processing system according to claim 5, wherein the first attribute information of the first user and the second attribute information of the second users include preferences of the first user and the second users.

8. The information processing system according to claim 1, wherein the CPU is further programmed to acquire a piece of second position information of the one or more pieces of second position information posted by any of a plurality of the second users having the relationship through the social networking service (SNS) server with the first user, based on a communication history with the first user and the second users on the social networking service (SNS) server, among the one or more pieces of second position information posted on the social networking service (SNS) server by the second users.

9. The information processing system according to claim 1, wherein the CPU is further programmed to: acquire information posted accompanying the one or more pieces of second position information; and transmit the one or more pieces of second position information and the information posted accompanying the one or more pieces of second position information to the on-vehicle apparatus.

10. The information processing system according to claim 1, wherein the on-vehicle apparatus is a device mounted on the vehicle.

11. The information processing system according to claim 1, wherein the on-vehicle apparatus is portable.

12. A method of processing information using an information processing device, wherein the information processing device includes one or more computers connected via a first network to an on-vehicle apparatus and via a second network to a social networking service (SNS) server, the method comprising:
receiving, by the one or more computers via the first network, a piece of first position information from the on-vehicle apparatus used by a first user, wherein the on-vehicle apparatus is mounted on a vehicle including an accessory power supply, and the piece of first position information includes position information of the vehicle generated from a global positioning system (GPS) of the on-vehicle apparatus upon turning on the accessory power supply by the first user;
acquiring, by the one or more computers via the second network, one or more pieces of second position information, the one or more pieces of second position information being posted on the social networking service (SNS) server by a second user having a relationship through the social networking service (SNS) server with the first user based on the piece of first position information; and
transmitting, by the one or more computers via the first network, the one or more pieces of second position information to the on-vehicle apparatus,
wherein the one or more pieces of second position information is displayed including a predetermined graphic and superimposed on a corresponding point of interest (POI) position on the GPS of the on-vehicle apparatus to guide the first user for driving the vehicle to the POI position.

13. The method of processing information according to claim 12, wherein the on-vehicle apparatus is portable.

14. A non-transitory computer-readable recording medium storing a program that, when executed by an information processing device including one or more computers that are connected via a first network to an on-vehicle apparatus and via a second network to a social networking service (SNS) server, performs the following steps of:
receiving, by the one or more computers via the first network, a piece of first position information from the on-vehicle apparatus used by a first user, wherein the on-vehicle apparatus is mounted on a vehicle including an accessory power supply, and the piece of first position information includes position information of the vehicle generated from a global positioning system (GPS) of the on-vehicle apparatus upon turning on the accessory power supply by the first user;
acquiring, by the one or more computers via the second network, one or more pieces of second position information, the one or more pieces of second position information being posted on the social networking service (SNS) server by a second user having a relationship through the social networking service (SNS) server with the first user based on the piece of first position information; and
transmitting, by the one or more computers via the first network, the one or more pieces of second position information to the on-vehicle apparatus,
wherein the one or more pieces of second position information is displayed including a predetermined graphic and superimposed on a corresponding point of interest (POI) position on the GPS of the on-vehicle apparatus to guide the first user for driving the vehicle to the POI position.

15. The non-transitory computer-readable recording medium according to claim 14, wherein the on-vehicle apparatus is portable.

* * * * *